(12) United States Patent
Chien (10) Patent No.: US 9,830,290 B2
(45) Date of Patent: Nov. 28, 2017

(54) IMAGE SHARING SYSTEM AND METHOD THEREOF

(71) Applicant: Chiun Mai Communication Systems, Inc., New Taipei (TW)

(72) Inventor: How-Wen Chien, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 148 days.

(21) Appl. No.: 14/864,028

(22) Filed: Sep. 24, 2015

(65) Prior Publication Data

US 2016/0103775 A1    Apr. 14, 2016

(30) Foreign Application Priority Data

Oct. 9, 2014   (CN) .......................... 2014 1 0529893

(51) Int. Cl.
*G06F 13/14* (2006.01)
*G06F 13/362* (2006.01)
*H04W 4/00* (2009.01)

(52) U.S. Cl.
CPC .......... *G06F 13/362* (2013.01); *H04W 4/008* (2013.01)

(58) Field of Classification Search
None
See application file for complete search history.

(56) References Cited

U.S. PATENT DOCUMENTS

| | | | | |
|---|---|---|---|---|
| 7,953,785 B2 * | 5/2011 | Li | ...................... | G06F 17/30174 709/201 |
| 8,340,492 B2 * | 12/2012 | Vasudevan | ............. | H04N 5/765 380/204 |
| 8,923,910 B2 * | 12/2014 | Wu | ...................... | H04W 52/343 455/522 |
| 8,934,596 B2 * | 1/2015 | Li | .......................... | H04W 56/00 375/219 |
| 9,344,485 B2 * | 5/2016 | Smadi | ...................... | H04L 67/06 |
| 9,480,076 B2 * | 10/2016 | Jung | .................... | H04W 72/121 |
| 2008/0005195 A1 * | 1/2008 | Li | ...................... | G06F 17/30174 |
| 2013/0239020 A1 * | 9/2013 | Heo | ........................ | G06Q 10/10 715/753 |
| 2014/0280605 A1 * | 9/2014 | Zhang | ................. | H04L 67/1095 709/205 |

* cited by examiner

Primary Examiner — Cheng-Yuan Tseng
(74) Attorney, Agent, or Firm — ScienBiziP, P.C.

(57) ABSTRACT

An image sharing system includes a first electronic device, a number of second electronic devices in wireless communication with the first electronic device, and a host electronic device in wireless communication with the first electronic device and the number of second electronic devices. The host electronic device is one of the second electronic devices designated by the first electronic device to capture an image. The first electronic device controls the host electronic device to capture the image. The first electronic device and the host electronic device each send the captured image to a corresponding second electronic device. The first electronic device controls each of the second electronic devices that have received the image to send the image to another second electronic device that has not yet received the image, until all of the second electronic devices have received the image.

19 Claims, 6 Drawing Sheets

IMAGE SHARING SYSTEM AND METHOD THEREOF

FIELD

The subject matter herein generally relates to image sharing technologies, and more particularly to an image sharing system and a method for sending an image to a plurality of electronic devices in the image sharing system.

BACKGROUND

Generally, to send an image captured by a first electronic device to a plurality of second electronic devices, the first electronic device may individually send the image to each of the second electronic devices.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series, and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
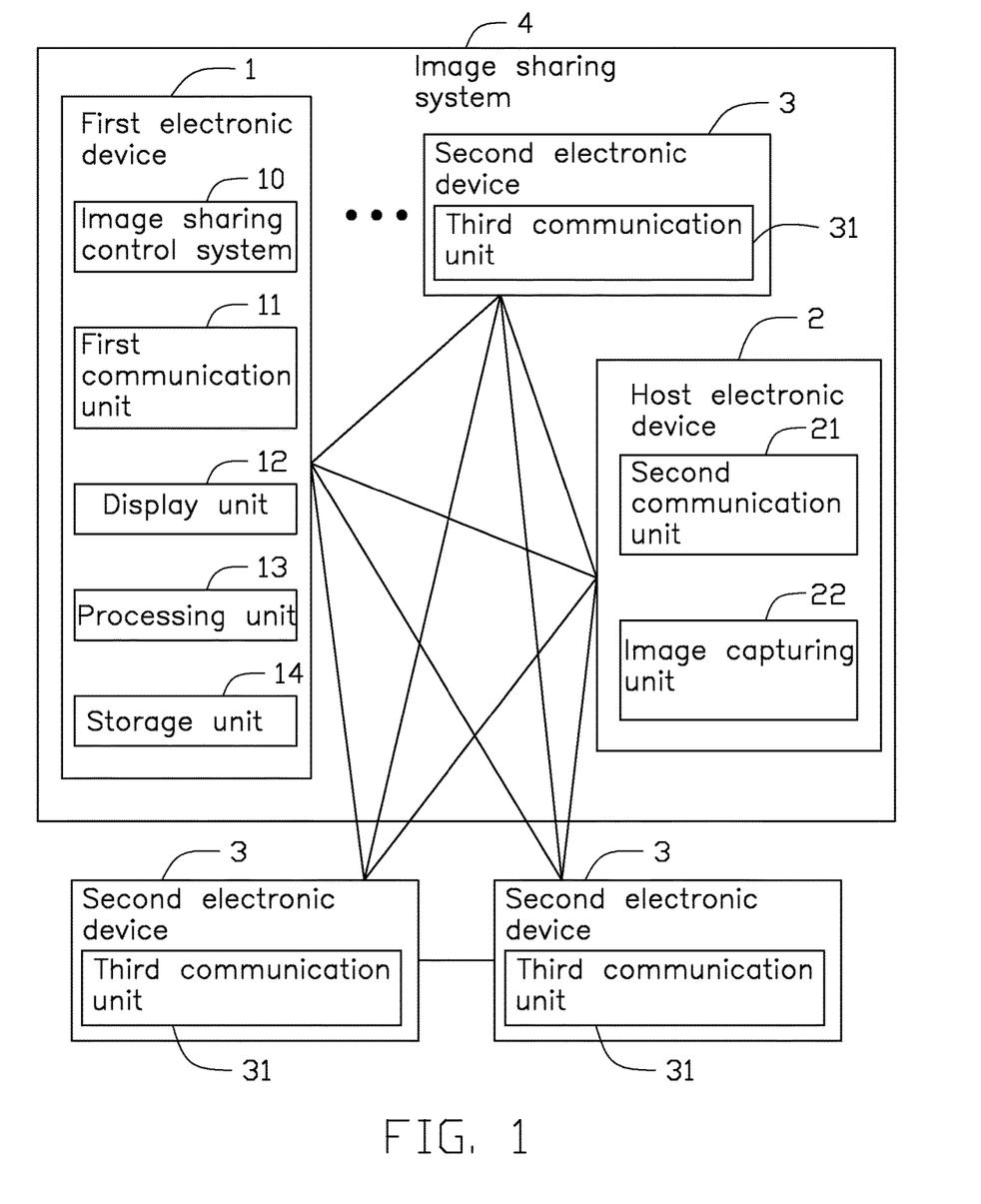
FIG. 1 is a diagrammatic view of an embodiment of an image sharing system.

FIG. 1 illustrates an embodiment of an image sharing system 4. The image sharing system 4 can include a first electronic device 1, a host electronic device 2, and a plurality of second electronic devices 3. The host electronic device 2 is one of the second electronic devices 3 designated by the first electronic device 1 to capture at least one image. The first electronic device 1 can control the host electronic device 2 to capture the at least one image. The first electronic device 1, the host electronic device 2, and the plurality of second electronic devices 3 can be portable electronic devices, such as a cellular phone, a tablet computer, a wearable device, a digital camera, or the like. The captured at least one image can be quickly sent to the first electronic device 1 and the plurality of second electronic devices 3 in the image sharing system 4.

The first electronic device 1 can include a first communication unit 11. The host electronic device can include a second communication unit 21. Each of the second electronic devices 3 can include a third communication unit 31. The first electronic device 1, the host electronic device 2, and the plurality of second electronic devices 3 can send and receive data with each other wirelessly through the first communication unit 11, the second communication unit 21, and the third communication unit 31, respectively. In at least one embodiment, the first communication unit 11, the second communication unit 21, and the third communication unit 31 communicate with each other through BLUETOOTH®. The host electronic device can further include an image capturing unit 22 for capturing the at least one image. The image capturing unit 22 can be a camera, for example.

The first electronic device 1 can further include an image capturing control system 10, a display unit 12, a processing unit 13, and a storage unit 14.

Figure 2:
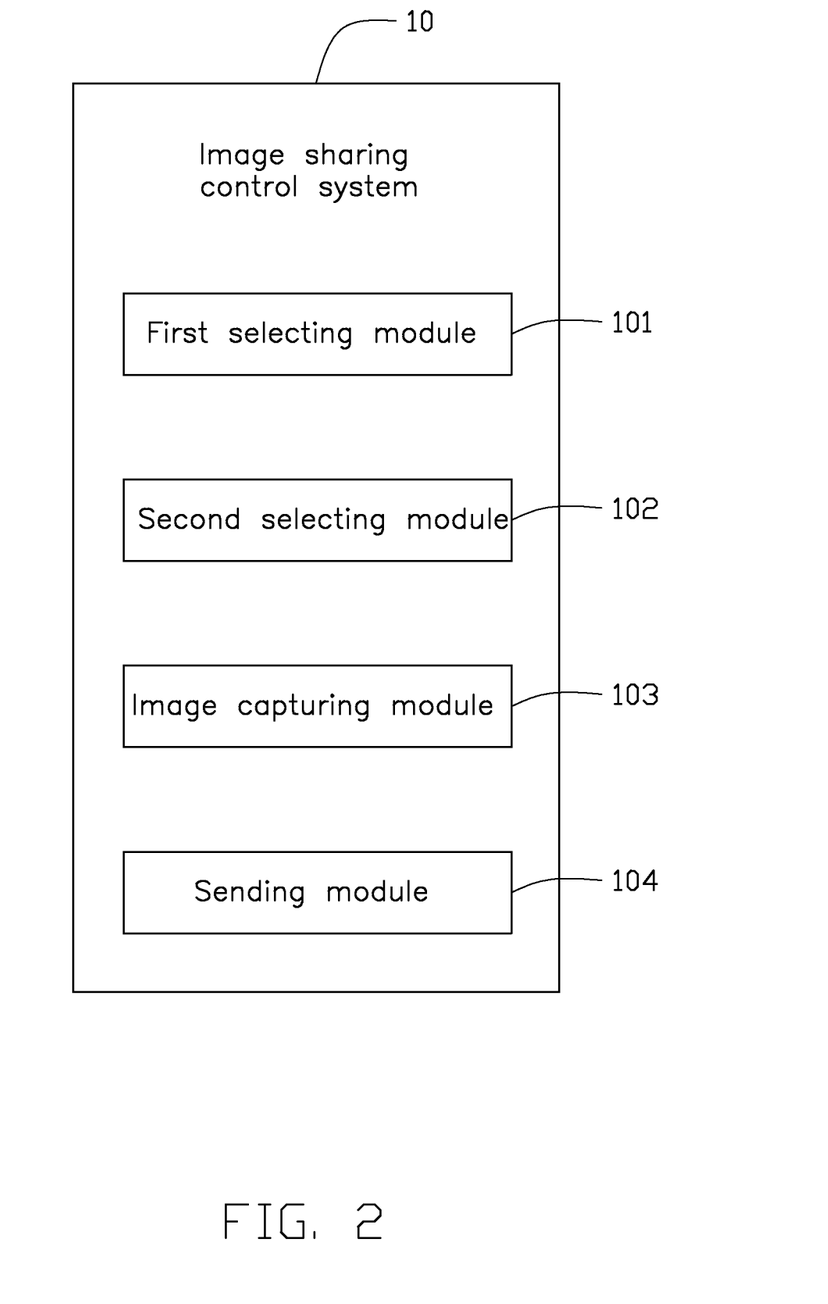
FIG. 2 is a block diagram of an embodiment of function modules of an image sharing control system of a first electronic device of FIG. 1.

Referring to FIG. 2, the image capturing control system 10 can include a first selecting module 101, a second selecting module 102, an image capturing module 103, and a sending module 104. The modules 101-104 can include one or more software programs in the form of computerized codes stored in the storage system 16. The computerized codes can include instructions executed by the processing unit 13 to provide functions for the modules 101-104.

The first selecting module 101 can search for the plurality of second electronic devices 3, and select the plurality of second electronic devices 3 to be added to a sharing list (not shown). In at least one embodiment, the first selecting module 101 searches for all of the second electronic devices 3 with the third communication unit 31 turned on within a predetermined vicinity of the first electronic device 1. The first selecting module 101 can send a first sharing invitation to each of the plurality of second electronic devices 3 to be added to the sharing list. The first selecting module 101 can add all of the second electronic devices 3 that accept the first sharing invitation to the sharing list in sequential order of the first electronic device 1 receiving signals of the second electronic devices 3 accepting the first sharing invitation. After the second electronic devices 3 are added to the sharing list, the first selecting module 101 can send the sharing list to each second electronic device 3 in the sharing list, and further send a second sharing invitation to each of the second electronic devices 3 in the sharing list to receive images shared by the other second electronic devices 3 in the sharing list. The electronic devices 3 that accept the second invitation can receive the at least one image captured by the host electronic device 2. The electronic devices 3 that reject the second invitation cannot receive the at least one image captured by the host electronic device 2.

The second selecting module 102 can designate one of the second electronic devices 3 in the sharing list to become the host electronic device 2, and further send a hosting invitation to the designated second electronic device 3. The second selecting module 102 can determine whether the designated second electronic device 3 accepts the hosting invitation. When the designated second electronic device 3 accepts the hosting invitation, then the designated second electronic device 3 becomes the host electronic device 2. When the designate second electronic device 3 rejects the hosting invitation or does not respond within a predetermined time duration, then the second selecting module 102 can send the hosting invitation to another second electronic device 3.

The image capturing module 103 can control the host electronic device 2 to display a viewfinder of the image capturing unit 22 of the host electronic device 2 on the display unit 12 of the first electronic device 1. The image capturing module 103 can adjust a plurality of settings of the image capturing unit 22 for capturing the at least one image. The plurality of settings can include an auto-focus setting, a flash setting, and a setting to switch a camera of the image capturing unit 22. After the settings are adjusted, the image capturing module 103 can control the image capturing unit 22 to capture the at least one image, display a preview of the captured at least one image on the display unit 12, and provide a prompt for a user of the first electronic device to accept or reject the captured at least one image. If the user rejects the captured at least one image, the image capturing module 103 can control the image capturing unit 22 to capture another image.

The sending module 104 can send a sending command to the host electronic device 2 to control the host electronic device 2 to send the at least one image to one of the second electronic devices 3. Meanwhile, the first electronic device can send the at least one image to another one of the second electronic devices 3. The sending module 104 can also send the sending command to the second electronic devices 2 that have received the at least one image in sequential order of the first electronic device 1 receiving signals of the second electronic devices 3 receiving the at least one image. The second electronic devices 3 that receive the sending command can send the at least one image another one of the second electronic devices 2 that has not yet received the at least one image. Thus, a speed of sending the at least one image to the second electronic devices 2 in the image sharing system 4 is increased.

Figure 3:
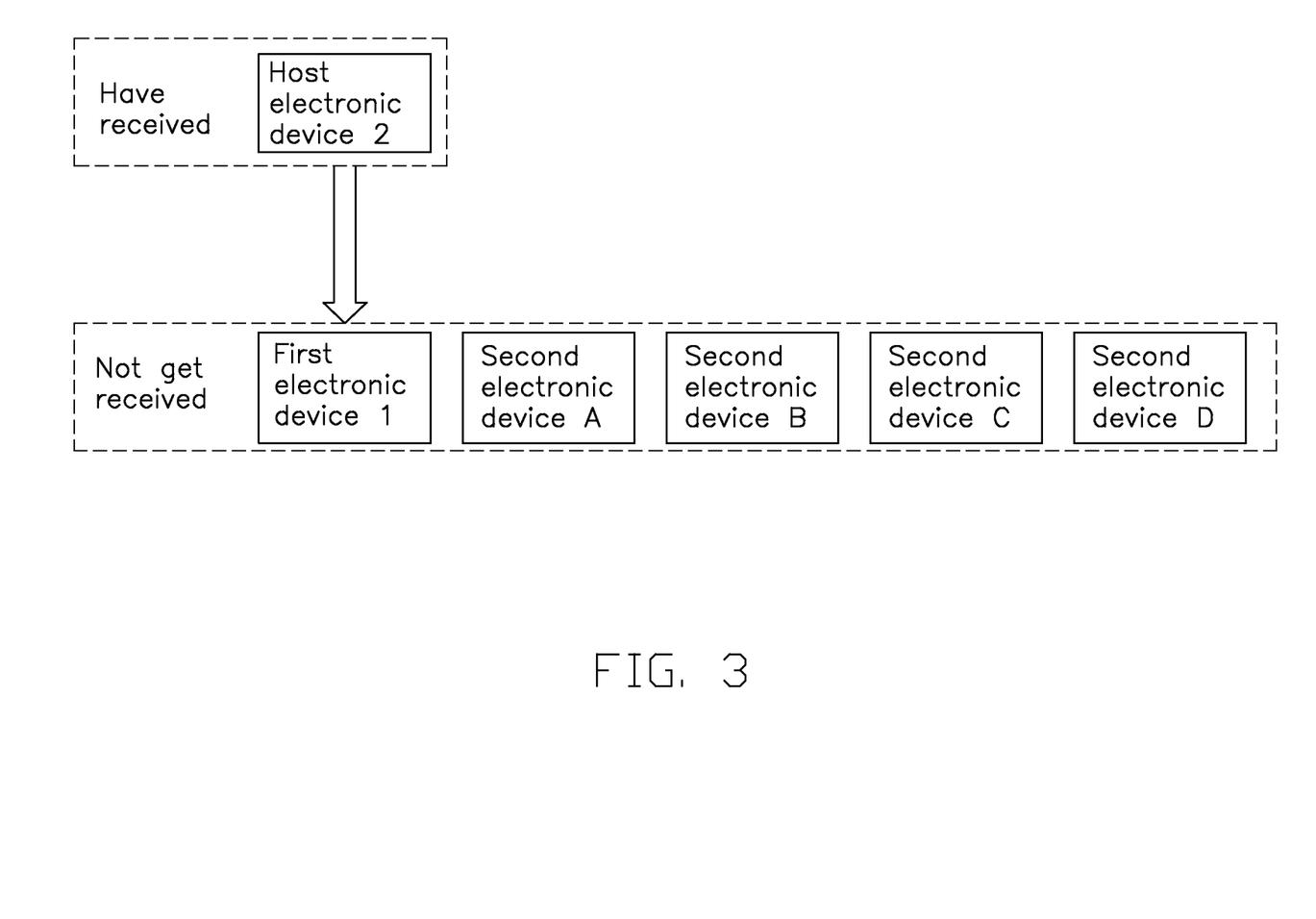
FIGS. 3-5 are diagrammatic views of a method for sending an image to a plurality of second electronic devices in the image sharing system.
Figure 4:
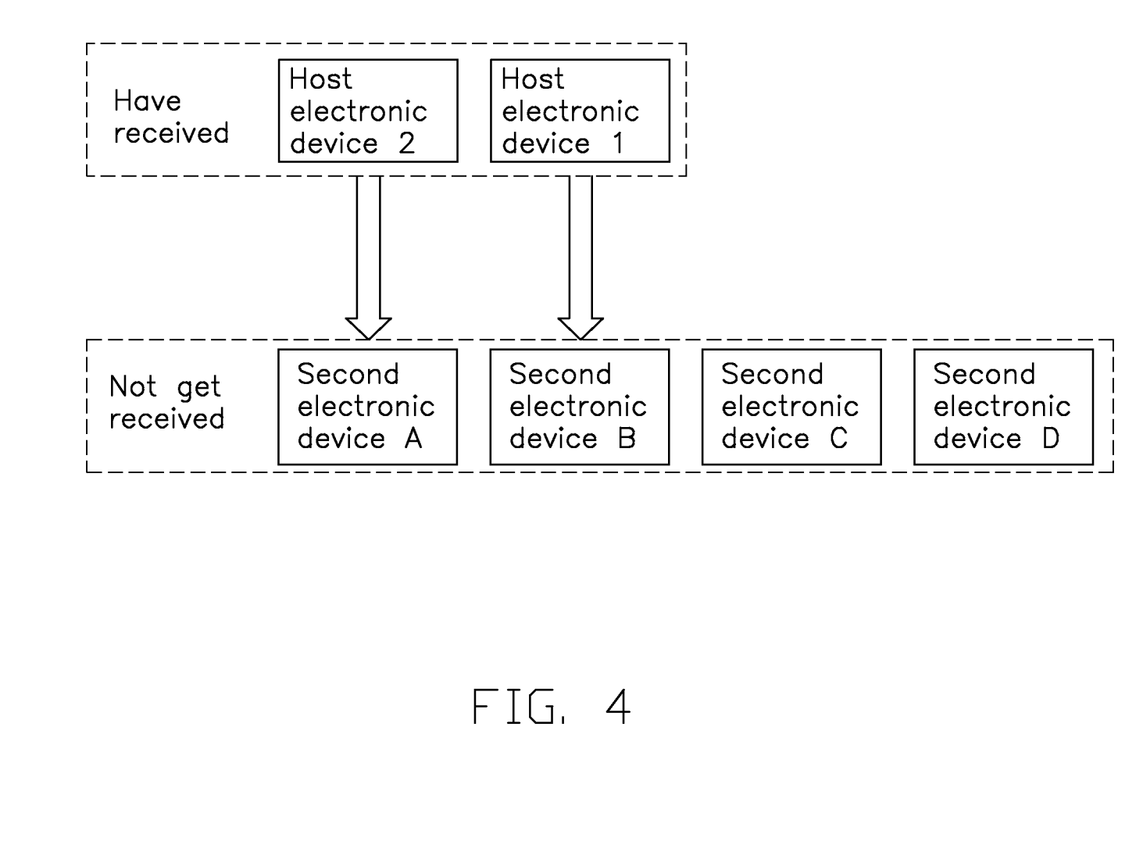
Figure 5:
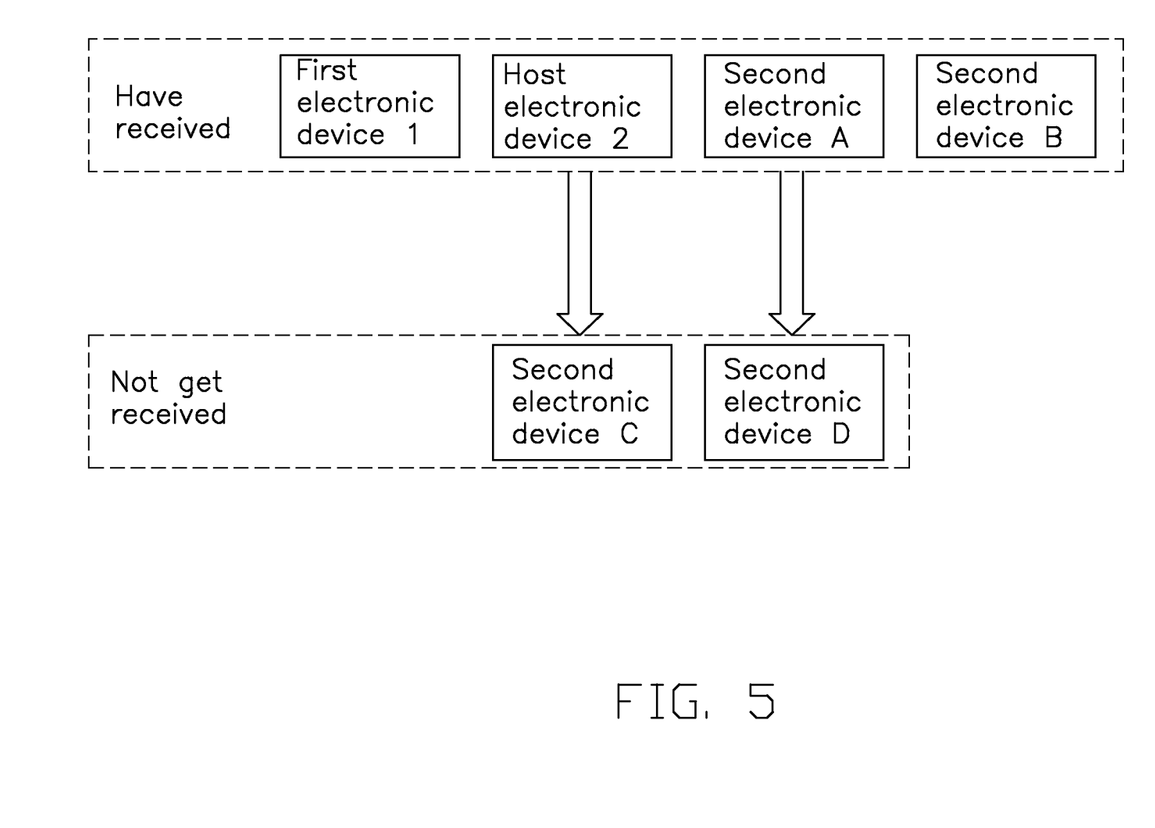

FIGS. 3-5 illustrate an embodiment of a method of sending the at least one image to the first electronic device 1 and the plurality of second electronic devices 3. As illustrated in FIG. 3, the image sharing system 4 includes the first electronic device 1, the host electronic device 2, and a plurality of second electronic devices A-D. After the host electronic device 2 captures the at least one image, the host electronic device 2 can send the at least one image to the first electronic device 1. The sending module 104 can send a sending command to the first electronic device 1 and the host electronic device 2 to control each of the first electronic device 1 and the host electronic device 2 to send the captured at least one image to a corresponding one of the second electronic devices A-D. As illustrated, the host electronic device 2 sends the at least one image to the second electronic device A, and the first electronic device 1 sends the at least one image to the second electronic device B. The sending module 104 can also send the sending command to the second electronic devices A-D in sequential order of the first electronic device 1 receiving signals of the second electronic devices A-D receiving the at least one image. As illustrated, the second electronic device A receives the at least one image before the second electronic device B, so the sending module 104 sends the sending command to the second electronic device A to control the second electronic device A to send the at least one image to the second electronic device D. Meanwhile, the host electronic device 1 sends the at least one image to the second electronic device C.

Figure 6:
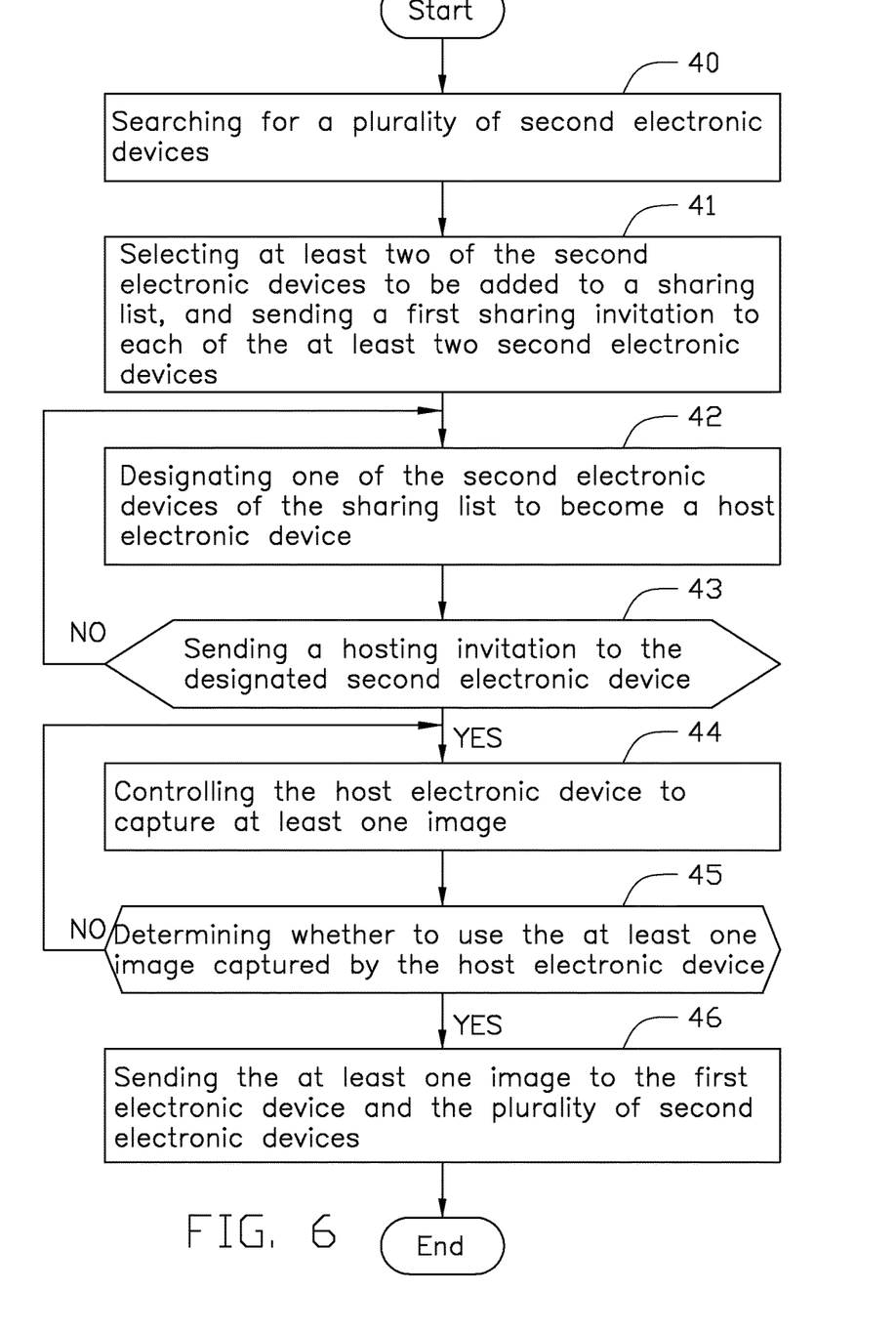
FIG. 6 is flowchart of a method for sharing an image in the image sharing system.

FIG. 6 illustrates a flowchart of an exemplary method for sharing images with multiple electronic devices. The example method is provided by way of example, as there are a variety of ways to carry out the method. The method described below can be carried out using the configurations illustrated in FIGS. 1-5, for example, and various elements of these figures are referenced in explaining the example method. Each block shown in FIG. 6 represents one or more processes, methods, or subroutines carried out in the example method. Furthermore, the illustrated order of blocks is by example only, and the order of the blocks can be changed. Additional blocks may be added or fewer blocks may be utilized, without departing from this disclosure. The example method can begin at block 40.

At block 40, a plurality of second electronic devices can be searched by a first electronic device.

At block 41, the second electronic devices are selected to be added to a sharing list, and a first sharing invitation is sent to each of the second electronic devices. In detail, the first electronic device can select the plurality of second electronic devices to be added to the sharing list. The first electronic device can send the first sharing invitation to each of the plurality of second electronic devices to be added to the sharing list. The first electronic device can add all of the second electronic devices that accept the first sharing invitation to the sharing list in sequential order of the first electronic device receiving signals of the second electronic devices accepting the first sharing invitation. After the second electronic devices are added to the sharing list, the first electronic device can send the sharing list to each second electronic device in the sharing list, and further send a second sharing invitation to each of the second electronic devices in the sharing list to receive images shared by the other second electronic devices in the sharing list. The second electronic devices that accept the second invitation can receive images sent by the other second electronic devices. The electronic devices that reject the second invitation cannot receive images sent by the other second electronic devices.

At block 42, one of the second electronic devices of the sharing list is designated by the first electronic device to become a host electronic device.

At block 43, a hosting invitation is sent to the designated second electronic device. When the designated second electronic device accepts the hosting invitation, block 44 is implemented. When the designated second electronic device rejects the hosting invitation or does not respond to the hosting invitation, block 42 is implemented.

At block 44, the host electronic device is controlled by the first electronic device to capture at least one image. In detail, the first electronic device can control the host electronic device to display a viewfinder of an image capturing unit of the host electronic device on a display unit of the first electronic device. The first electronic device can adjust a plurality of settings of the image capturing unit for capturing the at least one image. The plurality of settings can include an auto-focus setting, a flash setting, and a setting to switch a camera of the image capturing unit. After the settings are adjusted, the first electronic device can control the image capturing unit to capture the at least one image, display a preview of the captured at least one image on the display unit, and provide a prompt for a user of the first electronic device to accept or reject the captured at least one image.

At block 45, the at least one image captured by the host electronic device is accepted or rejected by the first electronic device. When the first electronic device accepts the captured at least one image, block 46 is implemented. When the first electronic device rejects the captured at least one image, block 44 is implemented.

At block 46, the at least one image captured by the host electronic device is sent to the first electronic device and the plurality of second electronic devices. In detail, the host electronic device can first send the at least one image to the first electronic device. The first electronic device can send a sending command to the host electronic device to control the host electronic device to send the at least one image to one of the second electronic devices. Meanwhile, the first electronic device can send the at least one image to another one of the second electronic devices. The first electronic device can also send the sending command to the second electronic devices that have received the at least one image in sequential order of the first electronic device receiving signals of the second electronic devices receiving the at least one image. The second electronic devices that receive the sending command can send the at least one image to another one of the second electronic devices that has not yet received the at least one image.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for sharing images with multiple electronic devices, the method comprising:
   searching, by a first electronic device, for a plurality of second electronic devices;
   selecting, by the first electronic device, at least two of the second electronic devices to be added to a sharing list;
   designating, by the first electronic device, one of the second electronic devices of the sharing list to become a host electronic device;
   controlling, by the first electronic device, the host electronic device to capture at least one image;
   controlling, by the first electronic device, the host electronic device to send the at least one image to the first electronic device; and
   sending, by the first electronic device and the host electronic device, the at least one image to the plurality of second electronic devices;
   wherein the plurality of second electronic devices are controlled by the first electronic device to share the at least one image with each other.

2. The method as in claim 1, wherein the first electronic device, the plurality of second electronic devices, and the host electronic device communicate with each other wirelessly.

3. The method as in claim 2, wherein the first electronic device, the plurality of second electronic devices, and the host electronic device wirelessly communicate with each other.

4. The method as in claim 1, wherein:
   after the first electronic device selects the at least two second electronic devices to be added to the sharing list, the first electronic device sends a first sharing invitation to each of the at least two second electronic devices; and
   the at least two second electronic devices are added to the sharing list in sequential order of the first electronic device receiving signals of the second electronic devices accepting the first sharing invitation.

5. The method as in claim 1, wherein:
   after the first electronic device designates one of the second electronic devices to become the host electronic device, the first electronic device sends a hosting invitation to the designated second electronic device; and
   the designated second electronic device becomes the host electronic device after accepting the hosting invitation.

6. The method as in claim 5, wherein when the second electronic device designated by the first electronic device rejects the hosting invitation or does not respond within a predetermined time duration, the first electronic device designates another second electronic device to become the host electronic device.

7. The method as in claim 1, wherein:
   after selecting the at least two second electronic devices to be added to the sharing list, the first electronic device sends the sharing list to the at least two second electronic devices, and further sends a second sharing invitation to the at least two second electronic devices; and
   each of the at least two second electronic devices accepts or rejects the sharing invitation to receive the at least one image captured by the hosting electronic device.

8. The method as in claim 1, wherein:
   before the host electronic device captures the at least one image, the first electronic device controls the host electronic device to display a viewfinder of an image capturing unit of the host electronic device on a display unit of the host electronic device; and
   the first electronic device can control a plurality of settings of the image capturing unit of the host electronic device for capturing the at least one image.

9. The method as in claim 8, wherein the plurality of settings comprises an auto-focus setting, a flash setting, and a setting to switch a camera of the image capturing unit.

10. The method as in claim 1, wherein:
    after the host electronic device captures the at least one image, the first electronic device previews the at least one image and accepts or rejects the at least one image;
    the first electronic device controls the host electronic device to recapture the at least one image, when the first electronic device rejects the at least one image; and
    the host electronic device sends the at least one image to the first electronic device, when the first electronic device accepts the at least one image.

11. The method as in claim 10, wherein:
    after the host electronic device sends the at least one image to the first electronic device, the first electronic device sends a sending command to the host electronic device to send the at least one image to one of the other second electronic devices;

the first electronic device and the host electronic device each send the at least one image to corresponding second electronic devices;

the first electronic device sends the sending command to each second electronic device that has received the at least one image in sequential order of the first electronic device receiving signals of the second electronic devices receiving the at least one image; and each second electronic device sends the at least one image to another second electronic device that has not yet received the at least one image, after receiving the sending command in sequential order of the first electronic device receiving signals of the second electronic devices receiving the at least one image, until all of the second electronic devices have received the at least one image.

12. An image sharing system comprising:

a first electronic device comprising an image sharing control system;

a plurality of second electronic devices in wireless communication with the first electronic device; and a host electronic device in wireless communication with the first electronic device and the plurality of second electronic devices;

wherein the host electronic device is one of the second electronic devices designated by the first electronic device to capture at least one image;

wherein the first electronic device controls the host electronic device to capture the at least one image;

wherein the first electronic device and the host electronic device each send the at least one image captured by the host electronic device to a corresponding second electronic device; and the first electronic device controls each of the second electronic devices that have received the at least one image to send the at least one image to another second electronic device that has not yet received the at least one image, until all of the second electronic devices have received the at least one image.

13. The image sharing system as in claim 12, wherein the first electronic device further comprises:

a first communication unit configured to establish wireless communication with the host electronic device and the plurality of second electronic devices, for enabling the first electronic device to send and receive data from the host electronic device and the plurality of second electronic devices;

a display unit;

a processing unit configured to execute a plurality of instructions of a plurality of modules of the image sharing control system; and a storage unit configured to store the plurality of instructions of the plurality of modules of the image sharing control system.

14. The image sharing system as in claim 12, wherein the host electronic device comprises:

a second communication unit configured to establish wireless communication with the first electronic device and the plurality of second electronic devices, for enabling the host electronic device to send and receive data with the first electronic device and the plurality of second electronic devices; and an image capturing unit configured to capture the at least one image.

15. The image sharing system as in claim 14, wherein the plurality of modules of the image sharing control system comprises:

a first selecting module configured to search for the plurality of second electronic devices, select the plurality of second electronic devices to be added to a sharing list; send a first sharing invitation to each of the plurality of second electronic devices to be added to the sharing list, and send a second sharing invitation to each of the plurality of second electronic devices in the sharing list to receive images shared by the other second electronic devices in the sharing list;

a second selecting module configured to designate one of the plurality of second electronic devices in the sharing list to become the host electronic device, send a hosting invitation to the designated second electronic device, and determine whether the designated second electronic device accepts the hosting invitation;

an image capturing module configured to control the host electronic device to display a viewfinder of the image capturing unit of the host electronic device on the display unit of the first electronic device, adjust a plurality of settings of the camera of the host electronic device for capturing the at least one image, control the image capturing unit to capture the at least one image, display a preview of the captured at least one image on the display unit, and provide a prompt for a user of the first electronic device to accept or reject the captured at least one image; and a sending module configured to send a sending command to the first electronic device and the host electronic device to control each of the first electronic device and the host electronic device to send the captured at least one image to a corresponding second electronic device, and send the sending command to the second electronic devices that have received the at least one image, to control the second electronic devices that have received the at least one image to send the at least one image to another second electronic device that has not yet received the at least one image.

16. The image sharing system as in claim 15, wherein:

the first selecting module adds each of the plurality of second electronic devices that accept the first sharing invitation to the sharing list in sequential order of the first electronic device receiving signals of the second electronic devices accepting the first sharing invitation;

the sending module sends the sending command to the second electronic devices that have received the at least one image in sequential order of the first electronic device receiving signals of the second electronic devices receiving the at least one image;

the second selecting module designates the second electronic device that accepts the host invitation as the host electronic device; and the second selecting module sends the host invitation to another second electronic device, after the designated second electronic device rejects the host invitation or does not respond to the host invitation within a predetermined time duration.

17. The image sharing system as in claim 12, wherein each of the second electronic devices comprises a third communication unit configured to send and receive data with the first electronic device and the host electronic device.

18. The image sharing system as in claim 12, wherein the first electronic device, the host electronic device, and the plurality of second electronic devices wirelessly communicate with each other.

19. The image sharing system as in claim 12, wherein the first selecting module searches for all of the second electronic devices with the third communication unit turned on within a predetermined vicinity of the first electronic device.

* * * * *